(12) United States Patent
Lokasaari et al.

(10) Patent No.: US 11,044,602 B2
(45) Date of Patent: Jun. 22, 2021

(54) USER EQUIPMENT AND METHOD OF CONTROLLING SUBSCRIPTIONS

(71) Applicant: Bittium Wireless Oy, Oulu (FI)

(72) Inventors: Jussi Lokasaari, Liminka (FI); Markku Leuanniemi, Oulu (FI); Janne Lääkkö, Oulu (FI)

(73) Assignee: Bittium Wireless Oy, Oulu (FI)

( * ) Notice: Subject to any disclaimer, the term of this patent is extended or adjusted under 35 U.S.C. 154(b) by 0 days.

(21) Appl. No.: 16/194,841

(22) Filed: Nov. 19, 2018

(65) Prior Publication Data
US 2019/0166491 A1 May 30, 2019

(30) Foreign Application Priority Data
Nov. 24, 2017 (EP) .................................... 17203544

(51) Int. Cl.
| | |
|---|---|
| H04M 1/66 | (2006.01) |
| H04W 12/02 | (2009.01) |
| H04W 48/18 | (2009.01) |
| H04W 8/18 | (2009.01) |
| H04W 76/36 | (2018.01) |
| H04W 76/50 | (2018.01) |
| H04W 12/43 | (2021.01) |
| H04W 88/06 | (2009.01) |

(52) U.S. Cl.
CPC .......... *H04W 12/02* (2013.01); *H04W 8/183* (2013.01); *H04W 12/43* (2021.01); *H04W 48/18* (2013.01); *H04W 76/36* (2018.02); *H04W 76/50* (2018.02); *H04W 88/06* (2013.01)

(58) Field of Classification Search
None
See application file for complete search history.

(56) References Cited

U.S. PATENT DOCUMENTS

| | | | |
|---|---|---|---|
| 7,260,390 B1 * | 8/2007 | Skinner | G06F 1/1626 379/201.01 |
| 2013/0237197 A1 * | 9/2013 | Ruvalcaba | H04W 8/183 455/418 |
| 2014/0026188 A1 * | 1/2014 | Gubler | H04W 12/12 726/3 |
| 2014/0073307 A1 * | 3/2014 | Zhang | H04L 69/18 455/418 |
| 2014/0273913 A1 | 9/2014 | Michel et al. | |

(Continued)

OTHER PUBLICATIONS

Search Report dated May 3, 2018 for European Patent Application No. 17203544.

(Continued)

*Primary Examiner* — Suhail Khan
(74) *Attorney, Agent, or Firm* — FisherBroyles, LLP

(57) ABSTRACT

User equipment of a wireless communication system includes subscriptions to network services. The user equipment receives wirelessly and detects an indication of a prioritized transmission of a network service requiring a prioritized subscription, and the user equipment has the prioritized subscription allowing an access to the network service of the prioritized transmission. The user equipment disables, on the basis of the detection of the indication, every subscribed network service, except the network service requiring the prioritized subscription, and allows the network service requiring the prioritized subscription.

13 Claims, 3 Drawing Sheets

(56) References Cited

U.S. PATENT DOCUMENTS

| | | | |
|---|---|---|---|
| 2014/0323090 A1* | 10/2014 | Keisala | H04W 8/18 |
| | | | 455/411 |
| 2015/0119103 A1 | 4/2015 | Ngai et al. | |
| 2015/0282057 A1* | 10/2015 | Li | H04B 7/0871 |
| | | | 455/552.1 |
| 2017/0118761 A1 | 4/2017 | Deshpande | |
| 2017/0272925 A1 | 9/2017 | Rupanagudi Venkata et al. | |
| 2017/0332222 A1 | 11/2017 | Raghunathan et al. | |
| 2017/0366926 A1* | 12/2017 | Ray | H04L 69/22 |
| 2017/0374544 A1* | 12/2017 | Lipka | H04W 48/18 |

OTHER PUBLICATIONS

Communication pursuant to Article 94(3) EPC received for EP Patent Application Serial No. 17203544.6 dated Jan. 29, 2021, 7 pages.

* cited by examiner

USER EQUIPMENT AND METHOD OF CONTROLLING SUBSCRIPTIONS

CROSS-REFERENCE TO RELATED APPLICATION

This application claims the benefit of European Patent Application No. 17203544.6, filed Nov. 24, 2017, which is incorporated by reference herein in its entirety.

BACKGROUND

Field

The invention relates to user equipment and a method of controlling subscriptions.

Description of the Related Art

The role of public safety and mission critical networks will become more important in the future. The next generation mobile devices have been developed for the markets. As a result, DSDS (Dual SIM Dual Standby, SIM=Subscriber Identity Module) user equipment such as a mobile phone allows the SIM cards to be accessed in a temporally alternative manner.

One of the SIM cards (non-prioritized, personal SIM) may be associated with a non-prioritized, personal communication and another of the SIM cards (prioritized SIM) may be associated with a prioritized communication. The non-prioritized, personal communication refers to a usual person's basic communication often related to private matters. The prioritized communication refers to public safety and/or communication in mission critical information transfer, for example.

Both SIM cards are in service when he or she is not at work or when no active mission critical communication is going on. Then a call, either made or received, causes the user equipment to disable one of the modem stacks and a SIM card associated with it, and it also causes the user equipment to use one of the modems and one of the SIM cards as a pair. If the call is associated with personal communication, the prioritized subscription is dropped out of service. Then the user equipment will lose information related to the public safety or from mission critical information transfer until the user is otherwise informed of the prioritized transmission.

DSDA (Dual SIM Dual Active) user equipment has two RF-parts (Radio Frequency) for active voice calls which enable it to receive calls on both SIM cards without disabling a selection of a SIM card. However, the calls may still not be simultaneous but must follow one after another. The DSDA user equipment will not block a private call during prioritized work, and hence the private call may prevent prioritized calls.

These kinds of problems are not acceptable in the public safety and mission critical use cases. Hence, there is a need to improve the mobile devices.

SUMMARY

The present invention seeks to provide an improvement in the mobile devices. According to an aspect of the present invention, there is provided a user equipment as specified in claim 1.

According to another aspect of the present invention, there is provided a method of controlling subscriptions in claim 12.

The invention has advantages. The user may use personal and public safety/mission critical network subscriptions in his/her user equipment and at the same time have fully automatized functionality with respect to crucially important networks such as the public safety and/or mission critical networks.

BRIEF DESCRIPTION OF THE DRAWINGS

Example embodiments of the present invention are described below, by way of example only, with reference to the accompanying drawings, in which.

DETAILED DESCRIPTION

The following embodiments are only examples. Although the specification may refer to "an" embodiment in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned.

It should be noted that while Figures illustrate various embodiments, they are simplified diagrams that only show some structures and/or functional entities. The connections shown in the Figures may refer to logical or physical connections. It is apparent to a person skilled in the art that the described apparatus may also comprise other functions and structures than those described in Figures and text. It should be appreciated that details of some functions, structures, and the signaling used for measurement and/or controlling are irrelevant to the actual invention. Therefore, they need not be discussed in more detail here.

Figure 1:
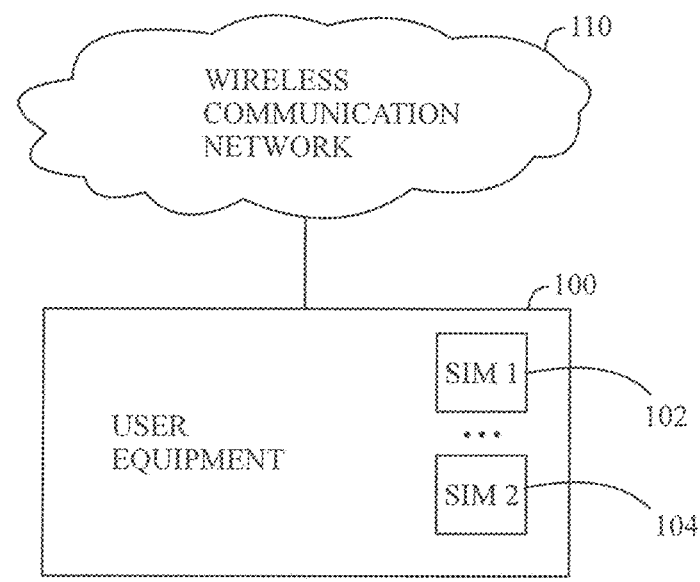
FIG. 1 illustrates an example of radio system.

FIG. 1 illustrates an example a wireless communication system that includes a wireless communication network 110 and at least one user equipment 100. The wireless communication system 110 may, in general, be any radio system. that supports the use of the subscriber identity modules 102, 104 in or associated with the user equipment 100. The subscriptions of network services may be based on the subscriber identity modules 102, 104 in a traditional manner eSIMs, USIMs, ISIM, SW SIM or the like, for example. The eSIM is an embedded subscriber identity module. The USIM is an universal subscriber identity module. The ISIM is an IP (Internet Protocol) multimedia services identity module which is an application residing on the UICC (Universal Integrated-Circuit Card). The SW SIM is a software subscriber identity module realized on the basis of a computer program which may voi laitteessa hyödyntää utilize e.g. Secure Element (SE), Trusted execution element (TEE) or Trusted platform module (TPM) technologies in the apparatus, for example. Thus, the subscriptions may be based on several kinds of SIMs which are either physical or virtual components or applications of computer programs.

The radio system may be WLAN (Wireless Local Area Network), WiFi (Wireless Fidelity) or of certain generation (such as 2G, 3G, 4G, beyond 4G, etc.). The wireless communication system may be GSM (Global System for Mobile Communications), WCDMA (Wideband Code Division Multiple Access) or long term evolution (LTE) for example, However, the radio system is not restricted to those. The wireless communication network 110 may be operated by one or more operators, and some or all may provide the subscriber, based on the SIMS 102, 104, with services. The operator is typically a company like Telia or AT&T or an authority like police or army.

One or more base stations (not shown in Figures) of the wireless communication network 110 communicate with the user equipment 100, For utilization of the wireless communication network 110 to communication, the user equipment 100 has to be identified and authorized, the identification and authorization being based on subscriptions. The data for the authorization may be stored in the SIMs 102, 104. Still, emergency calls may be possible without the SIMs 102, 104. The base station may be called, depending on the system, a Node B (enhanced or evolved), or an access point (AP). In general, the base station may be any equipment belonging to the network infrastructure of the wireless communication network 110 that implements the radio communication interface with the user equipment 100. The base station may be mobile or immobile.

Figure 2:
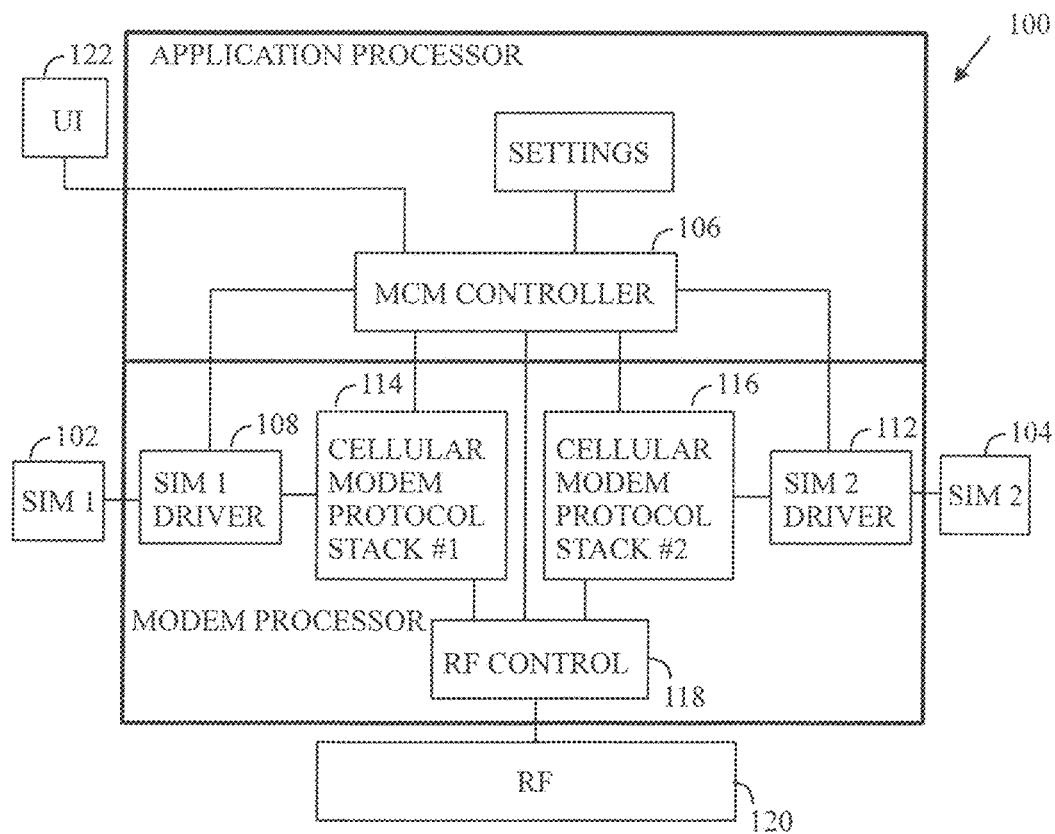
FIG. 2 illustrates an example of a block diagram of user equipment.

FIG. 2 illustrates an example of the user equipment 100 that may also be called subscriber equipment or a mobile terminal. In general, the user equipment 100 comprises a modem, a transceiver and RF paths. The user equipment 100 may have more than one subscriptions. The user equipment 100 may have more than one subscriber identity modules 102, 104 which is shown in FIGS. 1, 2, 3 and 5. The subscriber identity modules 102, 104 may define the subscriptions to the network services. One or more of the SIMs may be also USIMs. In an embodiment, it may be question of a DSDS (Dual SIM Dual Standby) user equipment. In an embodiment, it may be question of a DSDA (Dual SIM Dual Active) user equipment. In these cases, DSDS may refer to dual subscription, dual standby and DSDA may refer to dual subscription, dual active.

Each of the subscriber identity module 102, 104 may comprise an integrated circuit including at least one processor and at least one memory storing subscriber specific and network-specific data.

Data relating to the subscriptions may, for example, include an IMSI (International Mobile Subscriber Identity), an ICCID (Integrated Circuit Card identifier) of the SIM card, authentication information, information related to the communication network 110, personal identification number, PIN, for ordinary use, and PIN unlock code, PUK, for PIN unlocking, and data related to access possibilities of the subscriber, for example. The SIMs 102, 104 may also include other required data.

The data about the subscriptions is used to authenticate and identify subscribers on the wireless communication network 110 which may, in turn, be used to allow access to the data in the priority transmission. The data may be stored in the SIMs 102, 104, for example. The SIMS 102, 104 may be within a common removable SIM card or in separate SIM cards. The SIM cards, in general, come in many sizes. The prioritized communication may mean emergency telephone calls to/from police, firefighting, and medical services, and calls made in threatening or high importance situations, such as imminent peril or necessity for prompt decision or action, within a public or private sector. The private sector may refer to a worksite, an institution, an organization, a facility or a complex of buildings, for example.

The user equipment 100 is configured to receive wirelessly and detect an indication of a prioritized transmission of a network service requiring a prioritized subscription. The user equipment 100 has the prioritized subscription allowing an access to network service of the prioritized transmission. The user equipment 100 is then configured to disable, on the basis of the detection of the indication, any other subscribed network service except the network service requiring the prioritized subscription. That is, the user equipment 100 is configured to disable every subscribed network service besides the network service requiring the prioritized subscription on the basis of the detection of the indication. The user equipment 100 is also configured to allow the network service requiring the prioritized subscription on the basis of the detection of the indication. When the user equipment 100 disables the at least one network service, the user equipment 100 may disable user initiated communication irrespective of the terminal which initiated the communication. The user initiated communication may refer to traffic, but not necessarily control signaling. The user initiated communication may refer to voice calls, for example.

The user equipment 100 is also configured to allow user communication with the network service requiring the prioritized subscription.

Below the text refers to SIMs which may be understood as physical SIMs, virtual SIMs or subscriptions in general.

The user equipment 100 receives wirelessly and detects an indication of a prioritized transmission from a base station of the wireless communication network 110. A requirement of an access to the network service related to the prioritized transmission may mean that the user equipment 100 has a prioritized subscriber identity module meant or dedicated to the prioritized transmission among the SIMs 102, 104. That is, one of the SIMs 102, 104 has information required to allow the access to the network service of the prioritized transmission. The access to the network service may refer to an access to data contents of the prioritized transmission and/or the network service. The network service may refer to an application that enables storage, retrieval, modification, manipulation, exchange, presentation of data or the like, for example. A person skilled in the art knows how the access to network service and/or data contents of transmission is performed in a radio system, per se.

In an embodiment, there may be N SIMs in or connected with the subscriber equipment 110, where N is an integer larger than 1, and only one of the SIM is selected to be prioritized on the basis of the indication of a prioritized transmission.

Assume now that the SIM 102 is a SIM for the prioritized transmission, i.e. the SIM 102 makes it possible to access the data contents of the prioritized transmission. On the basis of the detection of the indication, the user equipment 100 disables access to and/or use of any other SIM 104 except the prioritized SIM 102 in an embodiment. A number of said other SIMs 104 may be one or more in general. In the case of the DSDS user equipment, one of the two SIMs is disabled. The user equipment 100 then also allows an access to and/or to the prioritized SIM 102 that is not disabled.

The user equipment 100 may disable, on the basis of the detection of the indication, communication between the user equipment 100 and any other SIM 104 except the prioritized SIM 102. The user equipment 100 may then allow communication between the user equipment 100 and the prioritized SIM 102. Without the indication, both, either or neither of the SIMs 102, 104 may be enabled/in operation.

According to an example of an embodiment of FIG. 2, a prioritized transmission mode controller 106, which may be a part of the application processor or a different or separate processor, may control a SIM driver 108 that is for the SIM 102 and a SIM driver 112 that is for the SIM 104. The prioritized transmission mode controller 106 may refer to an MCM (Mission Critical Mode) controller, a PS (Public Safety) controller or the like. The prioritized transmission mode 106 may disable, on the basis of the detection of the indication, either of the SIM drivers 108, 112 which, in turn, disables a corresponding SIM 102, 104. Simultaneously, the prioritized transmission mode 106 may, on the basis of the detection of the indication, enable or allow the operation of either of the SIM drivers 108, 112 thereby enabling or allowing the use of a corresponding SIM 102, 104, Without the indication, both, either or neither of the SIM drivers 108, 112 may be enabled/in operation.

In an embodiment, the prioritized transmission mode controller 106 may control a modem protocol stack 114 for the SIM 102 and a modem protocol stack 116 for the SIM 104. The prioritized transmission mode controller 106 may disable, on the basis of the detection of the indication, either of the modem protocol stacks 114, 116 which, in turn, disables a corresponding SIM 102, 104. Simultaneously, the prioritized transmission mode controller 106 may, on the basis of the detection of the indication, enable or allow the operation of either of the modem protocol stacks 114, 116 thereby enabling or allowing the use of a corresponding SIM 102, 104. Without the indication, both, either or neither of the modem protocol stacks 114, 116 may be enabled/in operation.

In an embodiment, the prioritized mode controller 106 may control an RF (Radio Frequency) controller 118 that is common to the SIMs 102, 104 in the DSDS user equipment. The RF controller 118 is used to share the RF parts 120 in turns to the SIMs 102, 104. The RF parts 120 may comprise a mixer that mixes the base band signal with a radio frequency carrier and produces an RF signal to be transmitted wirelessly from an antenna. That is, the RF controller 118 is used to share the RF parts 120 in turns for the SIMs 102, 104. The prioritized mode controller 106 may, on the basis of the detection of the indication, disable the operation the RF parts 120 for the any other SIM 104 except the prioritized SIM 102. The prioritized mode controller 106 may, on the basis of the detection of the indication, enable or allow the operation the RF parts 120 only in the manner suitable for the prioritized SIM 102. Without the indication, the RF parts 120 may be in use for both of the modem protocol stacks 114, 116 in turns.

Figure 3:
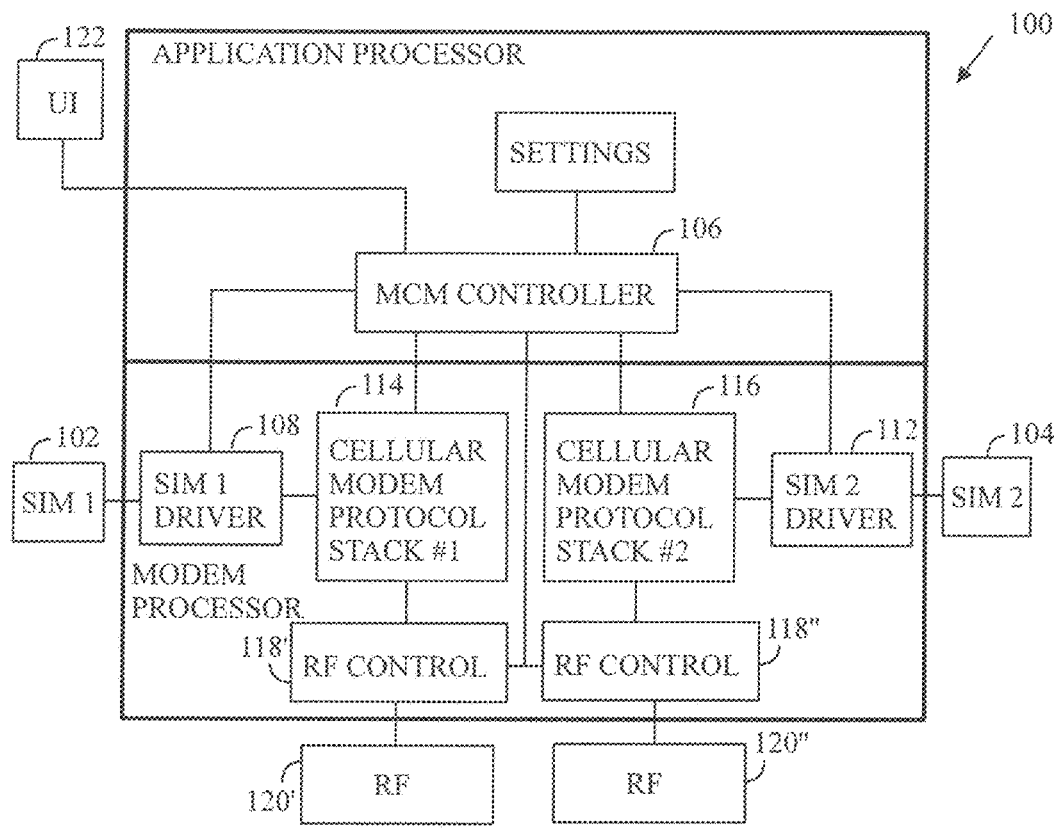
FIG. 3 illustrates an example of a block diagram of user equipment each SIM of which has its own RF controller.

FIG. 3 illustrates an example of an embodiment where each SIM 102, 104 has its own RF controller 118', 118" and RF parts 120', 120". Such a situation is realized when it is question of a DSDA user equipment, for example. In this embodiment, the prioritized mode controller 106 may control RF (Radio Frequency) controllers 118', 118" which may use to the RF parts 120', 120" in turns or simultaneously for the SIMs 102, 104. The prioritized mode controller 106 may, on the basis of the detection of the indication, disable the operation the RF parts 120" for the any other SIM 104 except for the RF parts 120' of the prioritized SIM 102. The prioritized mode controller 106 may, on the basis of the detection of the indication, enable or allow the operation the RF parts 120' which are for the prioritized SIM 102.

For example, when a fire fighter receives a non-professional call to his/her ordinary number during the fire fighter, whose user equipment is in the prioritized mode, is in an crucially important situation trying to extinguish the fire, the non-professional call is disabled in the user equipment of the fire fighter.

If, in an embodiment, there are two RF controllers 118', 118" which use a common RF part 120, the prioritized mode controller 106 may control RF (Radio Frequency) controllers 118', 118" which may use to the RF parts 120 in turns or simultaneously for the SIMs 102, 104. The prioritized mode controller 106 may, on the basis of the detection of the indication, disable the operation the RF controller 118" for the any other SIM 104 and allow the operation of the RF controller 118' for the prioritized SIM 102. The prioritized mode controller 106 may, on the basis of the detection of the indication, enable or allow the operation the RF controller 118' for the prioritized SIM 102.

In an embodiment, the user equipment 100 may detect the indication on the basis of at least one predetermined parameter that is associated with the prioritized transmission by an operator of a network of the prioritized transmission, a sender of the prioritized transmission and/or a maintainer of a radio bearer of the prioritized transmission. In an embodiment, the parameter may be data in a paging message that includes information on the prioritized transmission, for example. The data itself may be any predetermined data defined for the indication.

In an embodiment, the predetermined parameter may be a part of the prioritized transmission itself. In an embodiment, the parameter may be a frequency band in which the prioritized transmission is received. For example, a certain frequency band may be dedicated to the prioritized transmissions) such as public safety messages and/or mission critical mode messages such that no other kinds of messages may be sent in such a frequency band. That is, if a transmission is detected in said band, it will be an indication of the prioritized transmission.

In an embodiment, the user equipment 100 may detect the indication on the basis of a comparison between the at least one predetermined parameter data and reference data stored in a memory of the user equipment 100.

In an embodiment, the user equipment 100 may receive the reference data from the operator of the wireless communication network 110 of the prioritized transmission, the sender of the prioritized transmission and/or the maintainer of the channel of the prioritized transmission, and store it as initial indicative data or replace the existing indicative data with the received data. The initial indicative data may be data which comes from the communication network 110. The reference data may be stored in the user equipment 100.

In an embodiment, the user equipment 100 may detect whether the prioritized transmission has an indication in a protocol level that refers to a modem protocol layer, a modem protocol stack or a software stack. In an embodiment, the user equipment 100 may detect. In an embodiment, the user equipment 100 may detect whether a quality of service class identifier is at a level allocated to the prioritized transmission. In an embodiment, the user equipment 100 may detect whether a network of the prioritized transmission has become available. In an embodiment, the user equipment 100 may detect whether there is traffic in a channel dedicated to the prioritized transmission. In an embodiment, at least two of these detections may be combined.

The priority transmission has a bearer traffic quality of service class identifier that may have a predetermined level or predetermined levels which are different from any other transmission. The quality of service class identifier may be in the prioritized transmission itself and/or in the paging message transmission associated with the prioritized transmission.

That the prioritized transmission becomes available and/or there is traffic or a signal in a channel dedicated to the prioritized transmission may be detected on the basis of signal power, signal quality and/or information. If, for example, activity is detected in a frequency band of the prioritized transmission, it is the indication. The activity may be detected on the basis of a signal power of the electromagnetic radiation in the frequency band. A signal power at or above a predetermined level may be use as the indication of the prioritized transmission. Correspondingly, no signal power or a signal power lower than the predetermined level may be used as the indication of no prioritized transmission.

The signal quality may be higher in the prioritized transmission than in a personal communication. Thus, if the quality value is above that of the personal communication, it may be the indication of the prioritized transmission.

As already explained earlier in this application, the prioritized transmission may include a parameter which is the indication information about the prioritized transmission. The piece of information in the prioritized transmission for the indication may be a mobile country code (MCC) and/or mobile network code (MIC), for example.

A similar principal of detection may be utilized in any channel dedicated to the prioritized transmission.

In an embodiment, the radio frequency controller 118, 118', 118" of the user equipment 100 may, on the basis of the detection of the indication, disable the use of radio frequency parts 120, 120', 120" except for a reception of the prioritized transmission and a response to the prioritized transmission. Correspondingly, the radio frequency controller 118, 118', 118" of the user equipment 100 may, on the basis of the detection of the indication, enable or allow the use of radio frequency parts 120, 120', 120" for a reception of the prioritized transmission and a response to the prioritized transmission.

In an embodiment, the prioritized transmission mode controller 106 of the user equipment 100 may, on the basis of the detection of the indication, disable the operation of a modem protocol stack 116 of each of the subscriber identity modules 104 except that of the prioritized subscriber identity module 102. In an embodiment, the prioritized transmission mode controller 106 of the user equipment 100 may, on the basis of the detection of the indication disable each of drivers 112 of the subscriber identity modules 104 except that of the prioritized subscriber identity module 102. Additionally or alternatively, the prioritized transmission mode controller 106 of the user equipment 100 may, on the basis of the detection of the indication, control at least one radio frequency controller 118, 118', 118" to disable the use of radio frequency parts 120" except the radio frequency part 120' which is for a reception of the prioritized transmission and a response to the prioritized transmission. The radio frequency parts 120" may be tuned to a frequency band in which the prioritized transmission can be received.

In an embodiment, the user equipment 100 may present in a user interface 122 of the user equipment 120 information about the disabled operation. That the indication of the prioritized transmission is available and that the prioritized SIM 102 has been selected by disabling the operation based on any other SIM 104 may be presented visually and/or acoustically. The visual presentation may be a visually detectable sign on the screen of the user equipment 100. The acoustic presentation may an audible sound generated by the user equipment 100.

In an embodiment, the user equipment 100 may delay the disablement of the operation of any other subscriber identity modules 104 except the prioritized subscriber identity module 102 on the basis of the detection of the indication, if the user equipment 100 is active with an on-going emergency call. Then the user equipment 100 may disable the operation of any other subscriber identity modules 104 except the prioritized subscriber identity module 102 on the basis of a detection of an end of the emergency call. This kind of operation may be performed in a DSDA user equipment which may detect the indication during a call.

In an embodiment, the emergency calls may always be allowed. The prioritization may be cancelled if an emergency call has to be made with the user equipment 100.

Figure 4:
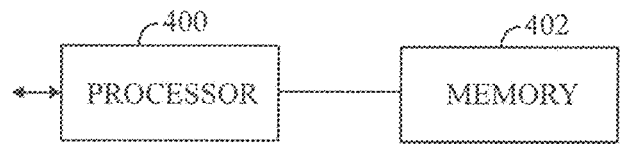
FIG. 4 illustrates an example of a controller with at least one processor and at least one memory.

In an embodiment an example of which is illustrated in FIG. 4, user equipment comprises one or more processors 400 and one or more memories 402 including computer program code. The one or more memories 402 and the one or more processors 400 with the computer program code may cause the user equipment 100 at least to: detect the indication of the prioritized transmission, an access to data contents of the prioritized transmission being only allowed with a prioritized subscriber identity module 102 of the subscriber identity modules 102, 104, and disable operation of any other subscriber identity modules 104 except the prioritized subscriber identity module 102 on the basis of said detection.

Figure 5:
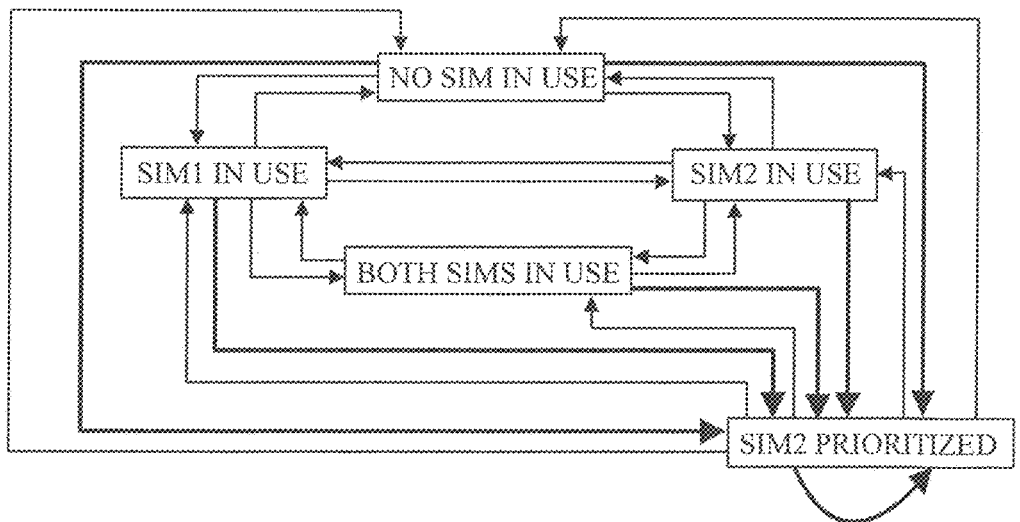
FIG. 5 illustrates an example of a block diagram of state transitions.

FIG. 5 illustrates an example of a block diagram of transitions between states associated with two SIMs 102, 104. The transitions marked in bold line refer to transitions to prioritized use of the SIM2 102 and the disablement of the SIM1 104. The transitions of the bold lines are made when the detection of the indication of the prioritized transmission has been made, Other transitions are normal transitions between states associated with two SIMs 102, 104. In a corresponding manner, SIM1 may be prioritized. Here the abbreviations SIM1 and SIM2 may refer to physical subscriber identification modules or to corresponding subscriptions without a reference to any particular physical entity.

Figure 6:
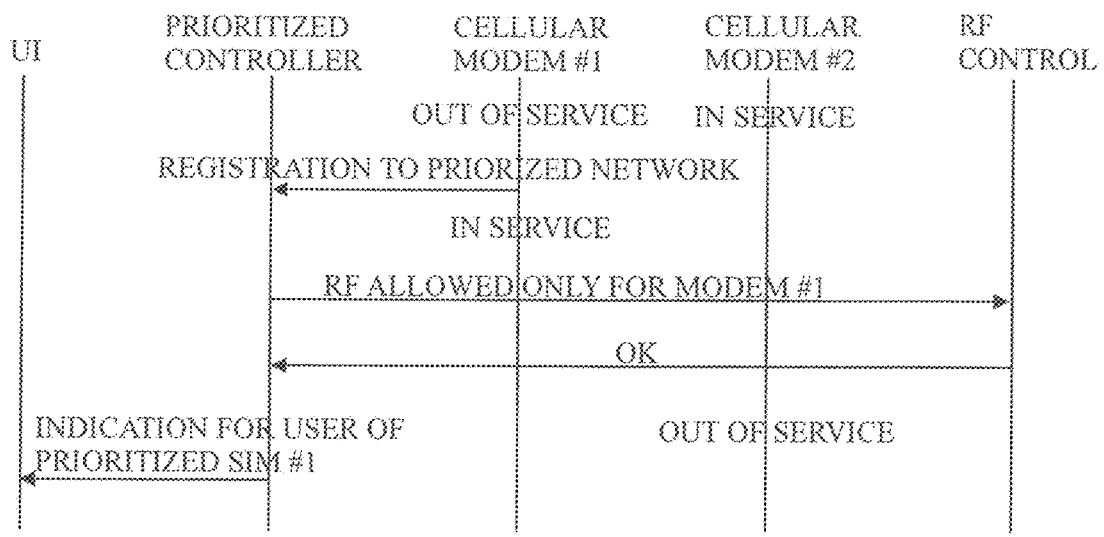
FIG. 6 illustrates an example of a signaling sequence.

FIG. 6 illustrates an example of signaling flow between the user interface 122, the prioritized controller 106, the modem protocol stack #1 114, the modem protocol stack #2 116 and the RF controller 118. FIG. 6 is based on the DSDS user equipment 100 illustrated in FIG. 2. First, the cellular modem #2 112, that may be for personal use and that is associated with the SIM 104, is in service. The cellular modem #1 is not in service then. When the prioritized transmission in the prioritized network is detected, the modem protocol stack #1 114 may require registration to the prioritized network from the prioritized controller 106. Then the prioritized controller 106 may allow the registration and command the RF controller 118 to control the use of the RF parts 120. The RF controller 118 then may inform that the cellular modem #2 104 is out of service. Finally, the user interface 122 may present the information related to the prioritized use to the user.

Figure 7:
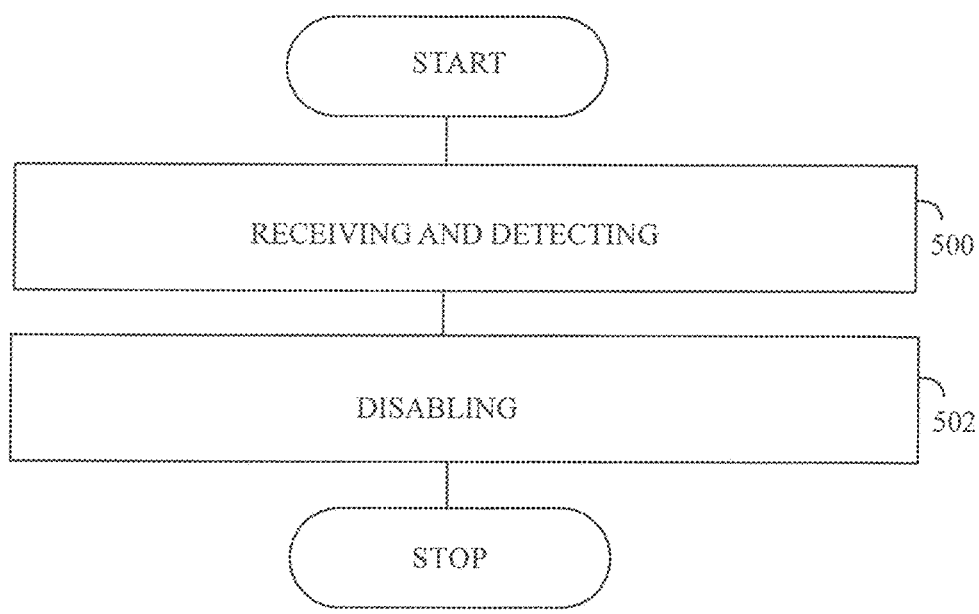
FIG. 7 illustrates of an example of a flow chart of the controlling method.

FIG. 7 is a flow chart of the measurement method. In step 500, an indication of a wireless prioritized transmission is received and detected by user equipment, an access to data contents of the prioritized transmission being only allowed with a prioritized subscriber identity module of the subscriber identity modules. In step 502, operation of any other subscriber identity modules is disabled except the prioritized subscriber identity module on the basis of the detection.

The method shown in FIG. 7 may be implemented as a logic circuit solution or computer program. The computer program may be placed on a computer program distribution means for the distribution thereof. The computer program distribution means is readable by the prioritized transmission mode controller, and it encodes the computer program commands, carries out the operation according to the algorithm of the method.

The computer program may be distributed using a distribution medium which may be any medium readable by the controller. The medium may be a program storage medium, a memory, a software distribution package, or a compressed software package. In some cases, the distribution may be performed using at least one of the following: a near field communication signal, a short distance signal, and a telecommunications signal.

It will be obvious to a person skilled in the art that, as technology advances, the inventive concept can be implemented in various ways. The invention and its embodiments are not limited to the example embodiments described above but may vary within the scope of the claims.

What is claimed is:

1. User equipment of a wireless communication system that has subscriptions to network services, wherein
the user equipment is configured to receive wirelessly and detect at least one of the following as an indication of a prioritized transmission of a network service requiring a prioritized subscription: a protocol level, a quality of service identifier, traffic in the prioritized channel, mobile country code and mobile network code, the user equipment having the prioritized subscription allowing an access to the network service of the prioritized transmission; and
the user equipment is configured to disable, on the basis of the detection of the indication, every subscribed network service except the network service requiring the prioritized subscription, and allow the network service requiring the prioritized subscription,
wherein a prioritized transmission mode controller of the user equipment is, on the basis of the detection of the indication, configured to at least one of
disable operation of a modem protocol stack for each of the subscriptions except that for the prioritized subscription for an indeterminate amount of time, or
disable each driver for the subscriptions except that of the prioritized subscription for an indeterminate amount of time.

2. The user equipment of claim 1, wherein the user equipment comprises user identity modules which are configured to define the subscriptions to the network services,
a requirement of an access to the network service based on the prioritized transmission being a prioritized subscriber identity module of the subscriber identity modules of the user equipment, and
the user equipment being configured to disable, on the basis of the detection of the indication, an access to any other subscriber identity modules except the prioritized subscriber identity module, and allow an access to the prioritized subscriber identity module.

3. The user equipment of claim 1, wherein the user equipment is configured to detect the indication on the basis of at least one predetermined parameter that is associated with the prioritized transmission by an operator of a network of the prioritized transmission, a sender of the prioritized transmission and/or a maintainer of a channel of the prioritized transmission.

4. The user equipment of claim 3, wherein the user equipment is configured to detect the indication on the basis of a comparison between the at least one predetermined parameter data and reference data stored in memory of the user equipment.

5. The user equipment of claim 4, wherein the user equipment is configured to receive the reference data from the operator of the network of the prioritized transmission, the sender of the prioritized transmission and/or the maintainer of the channel of the prioritized transmission, and store it as initial indicative data or replace the existing indicative data with the received data.

6. The user equipment of claim 1, wherein the user equipment is configured to detect whether the prioritized transmission has an indication, whether a quality of service is at a level allocated to the prioritized transmission, whether a network of the prioritized transmission has become available and/or whether there is traffic in a channel dedicated to the prioritized transmission.

7. The user equipment of claim 1, wherein at least one radio frequency controller of the user equipment is, on the basis of the detection of the indication, configured to disable the use of radio frequency parts except for reception of the prioritized transmission and a response to the prioritized transmission.

8. The user equipment of claim 1, wherein the user equipment is configured to present in a user interface of the user equipment information about the disabled operation and/or the prioritized operation.

9. The user equipment of claim 1, wherein the user equipment is configured to delay the disablement of the any other subscription except the prioritized subscription on the basis of the detection of the indication, if the user equipment is active with an on-going emergency call; and
the user equipment is configured to disable the any other subscription except the prioritized subscription on the basis of a detection of an end of the emergency call.

10. User equipment of claim 1, wherein user equipment comprises
one or more processors;
one or more memories comprising computer program code; and
the one or more memories and the one or more processors with the computer program code being configured to cause the user equipment to perform operations comprising:
detecting the indication of the wireless prioritized transmission of a network service requiring a prioritized subscription, the user equipment having the prioritized subscription; and
disabling any other subscription except the prioritized subscription on the basis of said detection.

11. The user equipment of claim 1, wherein the prioritized transmission mode controller of the user equipment is, on the basis of the detection of the indication, configured to control at least one radio frequency controller to disable use of radio frequency parts except for the reception of the prioritized transmission and the response to the prioritized transmission.

12. A method of controlling subscriptions of a user equipment, the method comprising:
receiving and detecting, by user equipment, at least one of the following as an indication of a wireless prioritized transmission of a network service requiring a prioritized subscription: a protocol level, a quality of service identifier, traffic in the prioritized channel, mobile country code and mobile network code, the user equipment having the prioritized subscription; and disabling every subscription except the prioritized subscription on the basis of the detection, and allowing the network service requiring the prioritized subscription, wherein, on the basis of detecting the indication, the method further comprises at least one of disabling operation of a modem protocol stack for each of the subscriptions except that for the prioritized subscription for an indeterminate amount of time, or disabling each driver for the subscriptions except that of the prioritized subscription for an indeterminate amount of time.

13. The method of controlling subscriptions of a user equipment of claim 12, wherein, on the basis of detecting the indication, the method further comprises controlling at least one radio frequency controller to disable use of radio frequency parts except for the reception of the prioritized transmission and the response to the prioritized transmission.

\* \* \* \* \*